(12) United States Patent
Lausen

(10) Patent No.: US 8,239,071 B2
(45) Date of Patent: Aug. 7, 2012

(54) METHOD FOR CONTROLLING AT LEAST ONE ADJUSTMENT MECHANISM OF A WIND TURBINE, A WIND TURBINE AND A WIND PARK

(75) Inventor: Hans Henrik Lausen, Randers (DK)

(73) Assignee: Vestas Wind Systems A/S, Aarhus (DK)

( * ) Notice: Subject to any disclaimer, the term of this patent is extended or adjusted under 35 U.S.C. 154(b) by 0 days.

(21) Appl. No.: 12/674,997

(22) PCT Filed: Sep. 1, 2008

(86) PCT No.: PCT/DK2008/000314
§ 371 (c)(1),
(2), (4) Date: Jan. 20, 2011

(87) PCT Pub. No.: WO2009/026930
PCT Pub. Date: Mar. 5, 2009

(65) Prior Publication Data
US 2011/0115224 A1 May 19, 2011

(30) Foreign Application Priority Data
Aug. 31, 2007 (DK) ................. 2007 01254

(51) Int. Cl.
F03D 7/00 (2006.01)
H02P 9/04 (2006.01)
G05B 11/01 (2006.01)

(52) U.S. Cl. ............. 700/287; 700/22; 323/234; 322/17
(58) Field of Classification Search ............... 700/19–22, 700/286–290; 323/205, 234, 299, 304, 318; 322/14–17, 37; 290/44, 55; 415/1; 416/1, 416/25–37
See application file for complete search history.

(56) References Cited

U.S. PATENT DOCUMENTS

| 5,141,391 | A  * | 8/1992  | Acton et al. .................. 415/119 |
| 5,652,485 | A  * | 7/1997  | Spiegel et al. ................ 318/147 |
| 6,619,918 | B1 * | 9/2003  | Rebsdorf ......................... 416/1 |
| 7,121,795 | B2 * | 10/2006 | Moroz et al. ..................... 416/1 |
| 7,351,033 | B2 * | 4/2008  | McNerney ........................ 416/1 |
| 7,420,289 | B2 * | 9/2008  | Wang et al. ..................... 290/44 |

(Continued)

FOREIGN PATENT DOCUMENTS
EP   1 666 723   6/2005
(Continued)

OTHER PUBLICATIONS

Riso National Laboratory; Guidelines for Design of Wind Turbines; 2002 Second Edition; pp. 1-54; Copenhagen, Denmark.

(Continued)

Primary Examiner — M. N. Von Buhr
(74) Attorney, Agent, or Firm — Wood, Herron & Evans, LLP (57) ABSTRACT

Method for controlling at least one adjustment mechanism of a wind turbine, said method comprising the steps of: establishing at least one load or operational value of the wind turbine, choosing a combination of at least two control strategies from a set of different control strategies based on the established at least one load or operational value, and applying the chosen combination of control strategies to control said at least one adjustment mechanism. The invention also relates to a wind turbine and a wind park.

14 Claims, 6 Drawing Sheets

U.S. PATENT DOCUMENTS

| | | | |
|---|---|---|---|
| 7,452,185 B2 * | 11/2008 | Ide et al. ............... | 416/35 |
| 7,602,075 B2 * | 10/2009 | Erdman et al. ........... | 290/44 |
| 2004/0119292 A1 * | 6/2004 | Datta et al. .............. | 290/44 |
| 2004/0151575 A1 | 8/2004 | Pierce et al. | |
| 2007/0018457 A1 | 1/2007 | Llorente Gonzalez | |
| 2007/0035135 A1 * | 2/2007 | Yoshida ................. | 290/44 |
| 2009/0097959 A1 * | 4/2009 | Vos et al. ............... | 415/1 |
| 2010/0014969 A1 * | 1/2010 | Wilson et al. ........... | 416/1 |

FOREIGN PATENT DOCUMENTS

| | | |
|---|---|---|
| WO | 2006069573 | 7/2006 |

OTHER PUBLICATIONS

Riso National Laboratory; Guidelines for Design of Wind Turbines; 2002 Second Edition; pp. 55-103; Copenhagen, Denmark.

Riso National Laboratory; Guidelines for Design of Wind Turbines; 2002 Second Edition; pp. 104-168; Copenhagen, Denmark.

Riso National Laboratory, Guidelines for Design of Wind Turbines; 2002 Second Edition; pp. 169-222; Copenhagen, Denmark.

Riso National Laboratory; Guidelines for Design of Wind Turbines; 2002 Second Edition; pp. 223-286; Copenhagen, Denmark.

Gabriele Giorgini; International Preliminary Report on Patentability and Written Opinion issued in related International Patent Application No. PCT/DK2008/000314; Mar. 2, 2010; 7 pages; European Patent Office.

Danish Office Action issued in priority Denmark application No. PA 2007 01254; Jun. 7, 2006; 1 page; Denmark Patent and Trademark Office.

Bossanyi, Hassan and Partners Ltd.; The Design of Closed Loop Controllers for Wind Turbines; Copyright 2000; 15 pages.

* cited by examiner

METHOD FOR CONTROLLING AT LEAST ONE ADJUSTMENT MECHANISM OF A WIND TURBINE, A WIND TURBINE AND A WIND PARK

FIELD OF INVENTION

The invention relates to a method for controlling at least one adjustment mechanism of a wind turbine, a wind turbine and a wind park.

DESCRIPTION OF THE RELATED ART

The control of rotor blades in a modern wind turbine may include and combine a number of pitch strategies. The combined strategies usually involve a common pitch strategy controlling the power generation of the wind turbine in relation to a predefined power/wind speed curve, and an overlaying pitch strategy ensuring that the components of the wind turbine are not damaged or worn-down too quickly based on measured environmental and wind turbine values. An overlaying pitch strategy may for example provide cyclic pitch of the rotor blades, to avoid rotor blade fatigue caused by load changes, when the blade moves past the wind turbine tower.

An example of a well-known combined pitch strategy for a wind turbine is disclosed in European patent application no. 1 666 723.

A problem with the well-known combined pitch strategy is a lower efficiency of the wind turbine and a lower utilization of the wind energy in order to protect the wind turbine as mentioned above.

It is an object of the present invention to provide solutions without the abovementioned disadvantage.

THE INVENTION

The invention provides a method for controlling at least one adjustment mechanism of a wind turbine, said method comprising the steps of:
establishing at least one load or operational value of the wind turbine,
choosing a combination of at least two control strategies from a set of different control strategies based on the established at least one load or operational value, and
applying the chosen combination of control strategies to control said at least one adjustment mechanism.

Examples of different and predefined control strategies are a common blade pitch control strategy, according to which all blades are pitched jointly and evenly, an individual blade pitch control strategy, according to which all blades are pitched individually, a collective blade pitch control strategy, a yaw control strategy or a combination of a common blade pitch strategy and an individual blade pitch strategy, a collective blade pitch strategy, a yaw control strategy or combinations hereof. Further it should be understood that further common, collective or individual blade pitch control strategies may be applied alone or in combination, such as a common blade pitch strategy for low wind speeds and a common blade pitch strategy for high wind speeds.

A collective blade pitch control strategy is e.g. a control strategy which has the goal of reducing fatigue loads by reducing tilt and yaw moments on the wind turbine rotor, e.g. caused by the wind shear on the wind turbine, i.e. differences in wind speed over the rotor plane. The collective pitching involves pitching the wind turbine blades according to the instantaneous azimuth position of each blade, determined according to one pitching algorithm for all blades.

An individual blade pitch strategy is a strategy which reduces fatigue loads on the individual blades. This may be performed by measuring loads on the blades and perform according thereto. Likewise experiential altering blade and/or pitch characteristics or the like may influence on the individual blade pitch strategy.

A yaw control strategy is where the yaw angle is adjusted to compensate for a yaw moment on the rotor, caused by an uneven wind distribution in the horizontal plane, caused e.g. by wake from an upstream wind turbine.

Choosing a control strategy is a compromise between conflicting interests, e.g. the highest possible annual power production and minimum wear and tear of the wind turbine parts. According to the invention as outlined above is ensured that only the necessary control strategy of a wind turbine is used in a given situation in order to optimize the wind turbine efficiency, without sacrifice of safety. At low wind velocities the wind turbine may for example be controlled by a common control strategy only, as the wind turbine fatigue is already reduced to an unproblematic level at such low wind velocities. Hereby the annual loss in power production of 0.5-1% caused by the application of collective or individual blade pitch control strategies and/or yaw control strategy at low wind speeds can be reduced. Further wear of the adjustment mechanisms can be reduced. Reduction of wear of the adjustment mechanisms is very favourable as maintenance of such mechanisms is relatively expensive, especially for wind turbines at remote locations, such as off shore wind turbines.

According to an embodiment the adjustment mechanism is a blade pitch mechanism. Hereby efficiency of the wind turbine is maintained while the blades are protected against overload and fatigue.

According to a supplementary or alternative embodiment the adjustment mechanism is a yaw mechanism. Hereby efficiency of the wind turbine is maintained while structural parts of the wind turbine are protected against overload and fatigue.

In an aspect of the present invention said control strategies at least involve a common control strategy. Hereby is ensured a basic control of the wind turbine at all times regardless of the choices made.

In another aspect of the present invention said set of control strategies includes a common blade pitch control strategy, and at least one of a collective blade pitch control strategy, an individual blade pitch control strategy or a yaw control strategy. The yaw control strategy may also benefit in efficiency from the adaptation of the control strategies to a given use situation of the wind turbine.

In an aspect of the present invention said method involves adjusting the weighting between said chosen combination of control strategies.

Adjustment of the weighting between a chosen combination of control strategies may e.g. be adjusting the weighting between the amount of individual blade pitching by means of one or more individual blade pitch control strategies, collective pitching by means of one or more collective blade pitch control strategy, the amount of common pitching performed by means of one or more common blade pitch control strategy and e.g. also one or more yaw control strategies. An example hereof may e.g. be to keep the amount of common pitching constant while increasing the individual pitching and turning down the collective pitching. Such weighting between the chosen combination of control strategies may give a further possibility of reducing the annual loss in power production, and at the same time give the advantage of reducing fatigue loads. The adjusting of the weighting between the chosen control strategies may be performed instantly to achieve a fast changes in the weighting, as well as performed gradually to reduce stress of the wind turbine components caused by the changes in weighting of the control strategies. The weighting between the combination of control strategies may result in further optimization of the output power from the wind turbine(s), and at the same time reduce the fatigue loads on the wind turbine blades and/or other wind turbine components. The weighting may be performed e.g. on the basis of load or operational values. It is of cause understood that the adjustment of one or more control strategies may be performed instantly, while the adjustment of other control strategies may be performed gradually.

In an aspect of the present invention said load or operational value is based on measurements, calculations or estimates of one or more parameters, such as wind speed, wind shear, wind direction, wind turbulence, temperature, yaw error, power generation, rotor rpm, blade loads (e.g. stresses, moments etc.), and fatigue limits. By measuring the wind speed and e.g. direction a clear and advantageous indication of the fatigue on the wind turbine components is ensured, but the control may also be based on a meteorological prediction of the wind speed for the nearest future. If considered appropriate the parameter may be a standard value or a value adapted for local conditions e.g. tall obstructions giving wind turbulence and thus fatigue when the wind is blowing from a special direction. Further parameters, such as the wind fluctuation, the power generation and/or the mechanical load measures on the wind turbine may be included to ensure that the comparison is as close to the situation of the wind turbine as possible by involving further parameters which also indicate the load on one or more wind turbine components.

In an aspect of the present invention said load or operational value includes a hysteresis band in order to avoid excessive control strategy switching. Hereby is an advantageous embodiment of the invention achieved.

In an aspect of the present invention a plurality of adjacent wind turbines, such as a wind park, is controlled independently or together by the same control strategy. Even though the wind turbines may be positioned several hundred meters apart, the environmental situation for the wind turbines is usually comparable and thus the control system may be reduced by controlling the wind turbine from just one system.

The invention further relates to a wind turbine comprising a rotor comprising at least one blade,
said wind turbine further comprising at least one adjustment mechanism and a controller adapted for controlling said adjustment mechanism according to a control strategy,
means for establishing at least one load or operational value of the wind turbine, and
a decision unit adapted for choosing at least one control strategy among a set of different control strategies in dependence of said load or operational value, where said chosen at least one control strategy can comprise a combination of control strategies.

Further, in aspects of the present invention said adjustment mechanism is a blade pitch mechanism and/or a yaw mechanism.

According to another aspect of the present invention, said wind turbine is a variable speed wind turbine with at least one utility grid connected power converter.

Hereby a modern wind turbine with a higher efficiency may be achieved by adapting the control strategies to a given use situation of the wind turbine.

In an aspect of the invention said wind turbine comprises a controller adapted for adjusting the weighting between said chosen combination of control strategies.

The invention further relates to a wind park comprising at least two wind turbines.

In an aspect of the present invention said at least two wind turbines are controlled independently or together. Hereby an advantageous embodiment of the invention is achieved.

FIGURES

The invention will be described in the following with reference to the figures in which.

DETAILED DESCRIPTION

Figure 1:
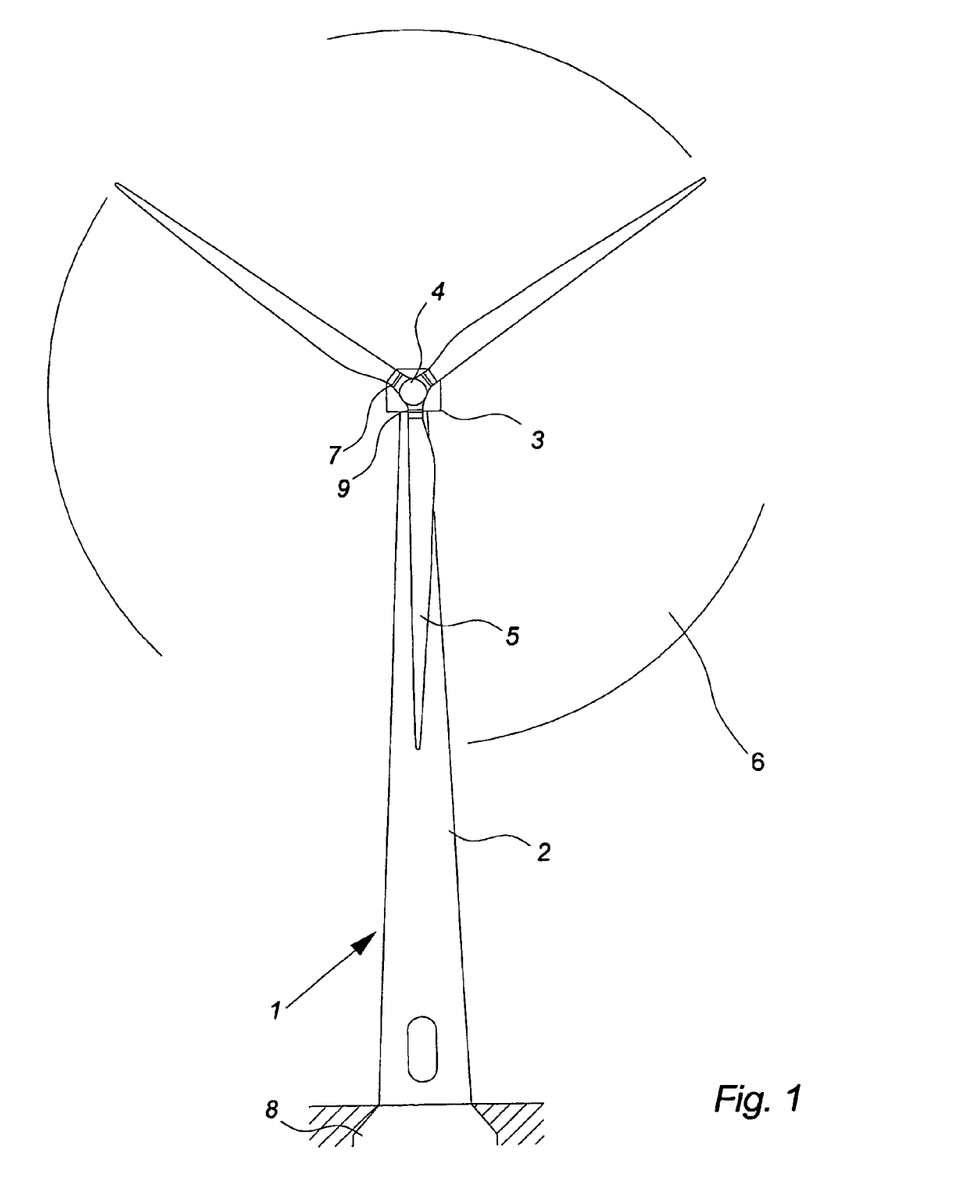
FIG. 1 illustrates a front view of a large modern wind turbine.

FIG. 1 illustrates a front view of a modern wind turbine 1 with a tower 2 positioned on a foundation 8. A nacelle 3 and hub 4 is positioned on top of the tower. The nacelle is connected to the tower top through a yaw mechanism 9 allowing the nacelle to turn in relation to the tower.

A rotor 6, comprising at least one blade such as two or three blades 5 as illustrated, is connected to the hub 4 through pitch mechanisms 7. Each pitch mechanism includes a blade bearing and pitch actuating means which allows the blade to pitch.

Figure 2:
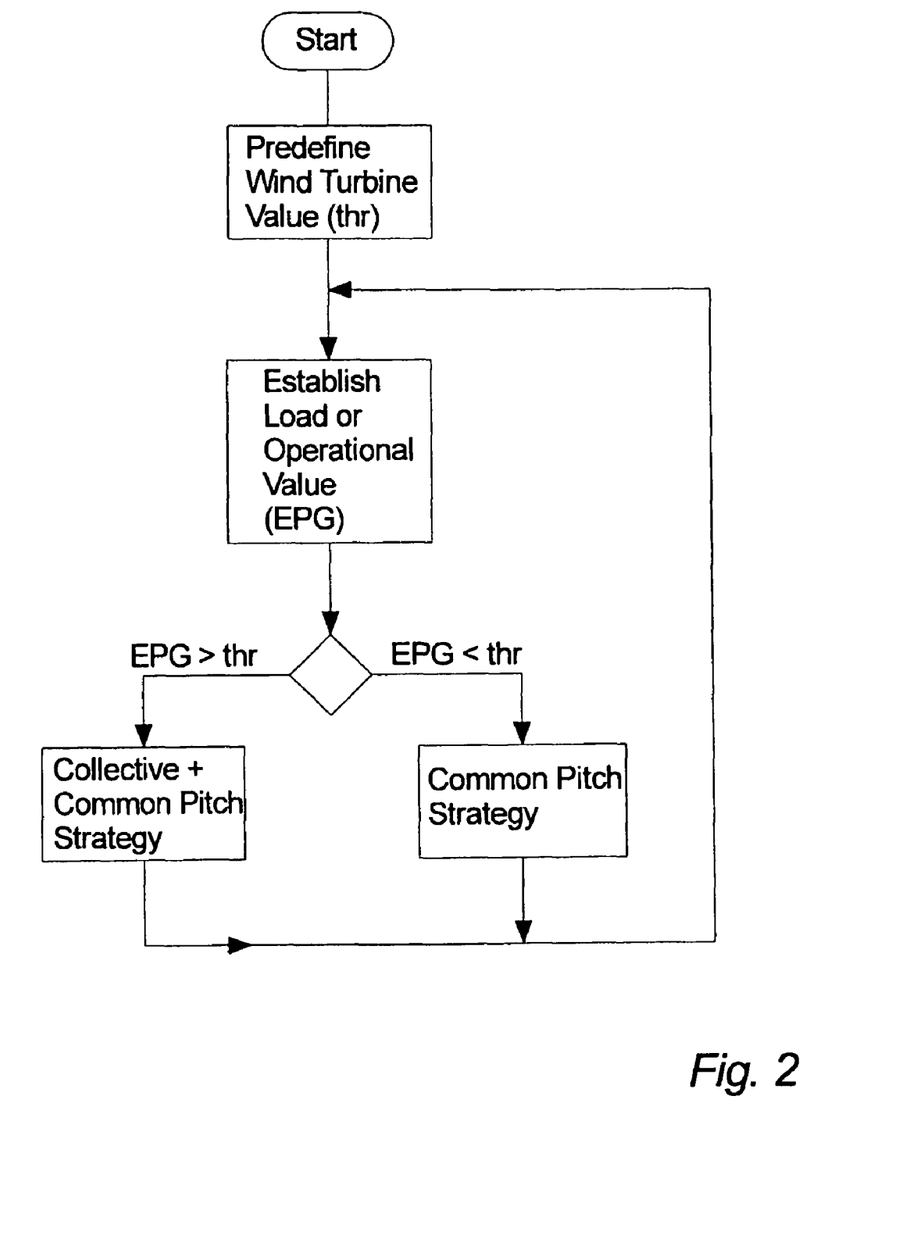
FIG. 2 illustrates a basic flow diagram of a method for controlling a wind turbine according to a preferred embodiment of the invention.

FIG. 2 illustrates a basic flow diagram of a method for controlling a wind turbine according to a preferred embodiment of the invention.

The wind turbine includes pitcheable rotor blades controlled by a blade pitch control strategy chosen among a set of predefined blade pitch control strategies, such as a common pitch strategy or a common pitch strategy combined with a collective and/or individual pitch strategy.

The method comprises the steps of:

Establishing a wind turbine value (thr), which for example defines a situation wherein the common pitch strategy may be used alone and the situation wherein the common pitch strategy has to be combined with the collective or individual pitch strategy in order to avoid excessive fatigue. The value may be predefined from knowledge of the wind turbine type and components used, the nature of the wind turbine site e.g. turbulence from tall obstructions and/or other empirical values of the wind turbine and the local wind turbine environment.

Continuously establishing a current load or operational value (EPG) of the wind turbine e.g. values of the present wind speed, power generation or other wind turbine load values as well as combinations hereof.

Comparing the EPG value with the predefined thr wind turbine value

Using the result to choose between different and predefined pitch strategies, such as a common pitch strategy (e.g. at a low wind speed), and a common pitch strategy combined with a collective or individual pitch strategy (e.g. at a high wind speed) in controlling the pitcheable rotor blades.

Figure 3A:
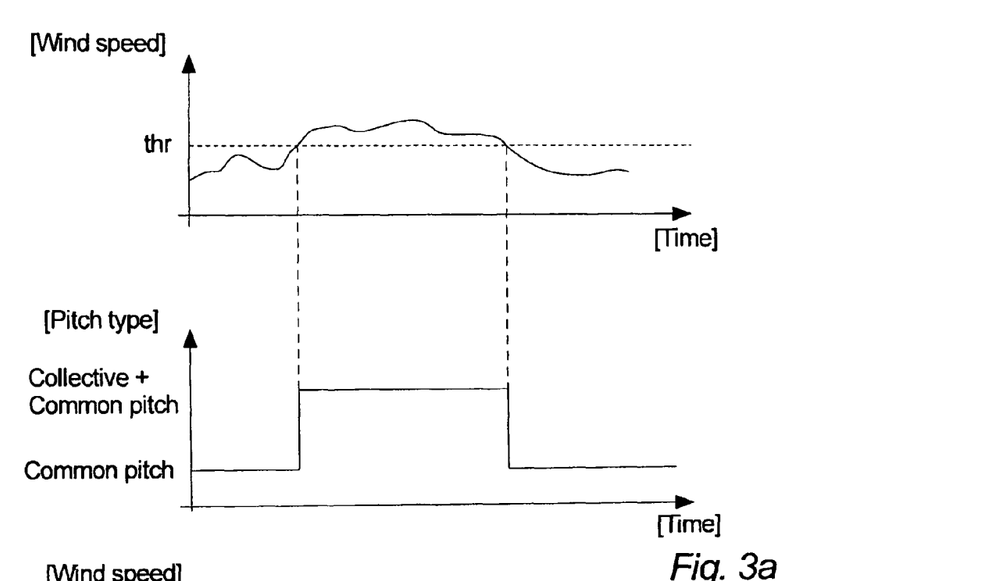
FIGS. 3a and 3b illustrate examples of pitch strategies at different wind speeds.
Figure 3B:
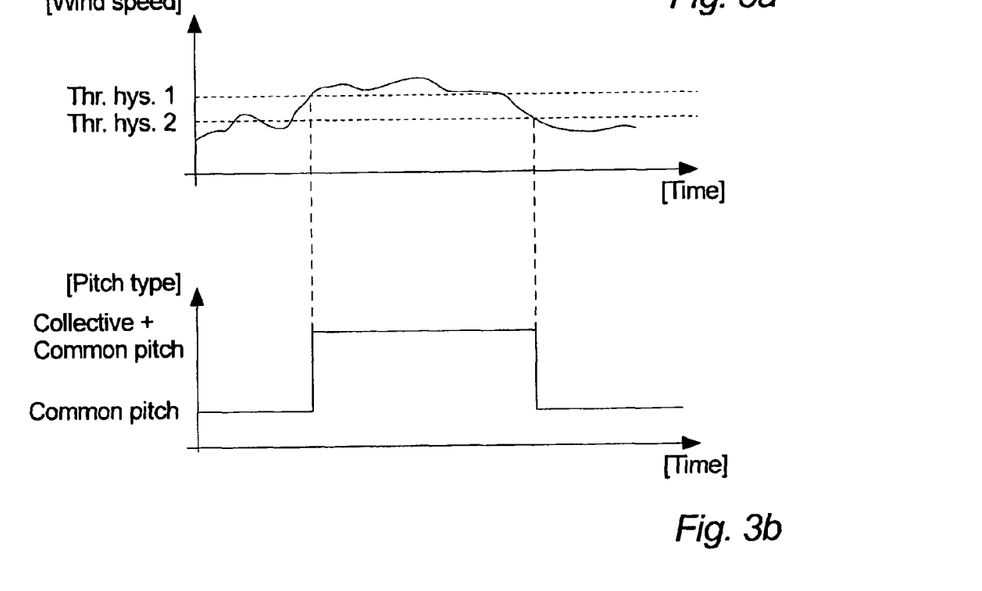

FIGS. 3a and 3b illustrate examples of use of common and collective pitch strategies in a wind turbine at fluctuating wind speeds.

FIG. 3a illustrates a first example wherein the wind speed fluctuates below and beyond a predefined wind speed value.

The collective blade pitch strategy is not applied when the wind speed is below the value. The rotor blade control by a common pitch strategy only allows the power generation to be optimum according to a power curve. The collective pitch strategy is reintroduced when the wind speed exceeds said predefined wind speed value in order to protect the rotor blade from overload and damage until the wind speed once again is below the value as illustrated.

FIG. 3b illustrates the same wind speed example but with a hysteresis band added in order to avoid excessive control strategy switching if the wind speed fluctuate in proximity of the predefined wind speed value. As can be seen switching takes place a little later compared to FIG. 3a.

In an embodiment of the invention which is not limited to the examples of FIGS. 3a and 3b but may be implemented into any other embodiments of the invention, other load or operational values than the wind speed may influent on the shift between common control strategy, and common control strategy combined with collective and/or individual control strategies. Such load or operational values may e.g. be measurements, calculations or estimates of one or more parameters, such as wind speed, wind shear, wind direction, wind turbulence, temperature, yaw error, power generation, rotor rpm, blade loads and/or other loads on the wind turbine components (e.g. stresses, moments etc.), and fatigue limits, as well as any other values (e.g. experiential values) which may be advantageous in relation to determine when a suitable shifting between e.g. common control strategies and common control strategies combined with collective and/or individual pitch control strategies, and/or yaw control strategies should be performed. It is of cause understood that the switching between control strategies may be dependent of a combination and/or weighting between a plurality of parameters to determine the switching between control strategies, and/or combination of control strategies.

Figure 4:
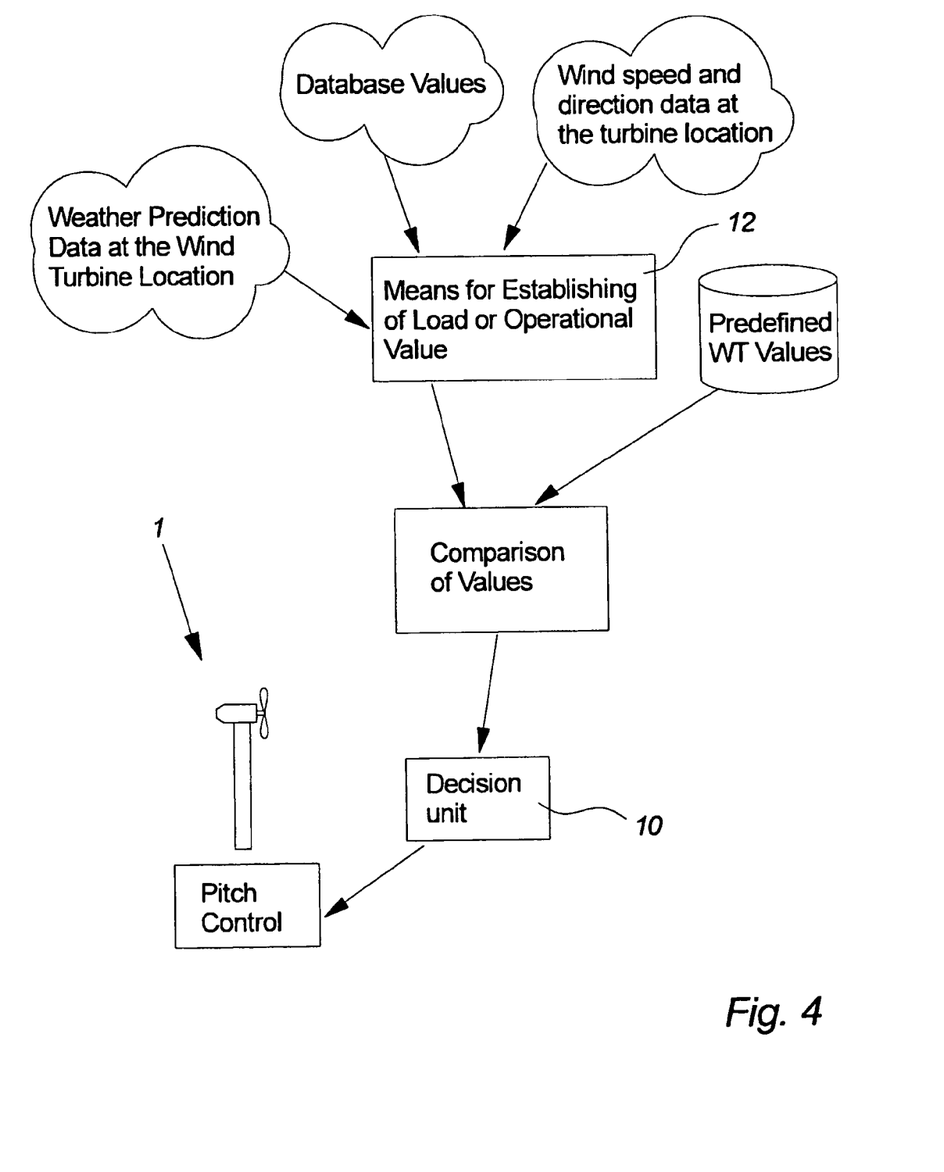
FIG. 4 illustrates a preferred embodiment of a wind turbine according to the invention.

FIG. 4 illustrates a wind turbine 1 according to a preferred embodiment of the invention comprising a decision unit 10 adapted for choosing at least one control strategy among the set of different control strategies in dependence of the above mentioned load or operational value (or EPG value). The load or operational values are established with means 12 for establishing at least one load or operational value such as instruments for measuring wind speed, wind direction or the like.

Figure 5:
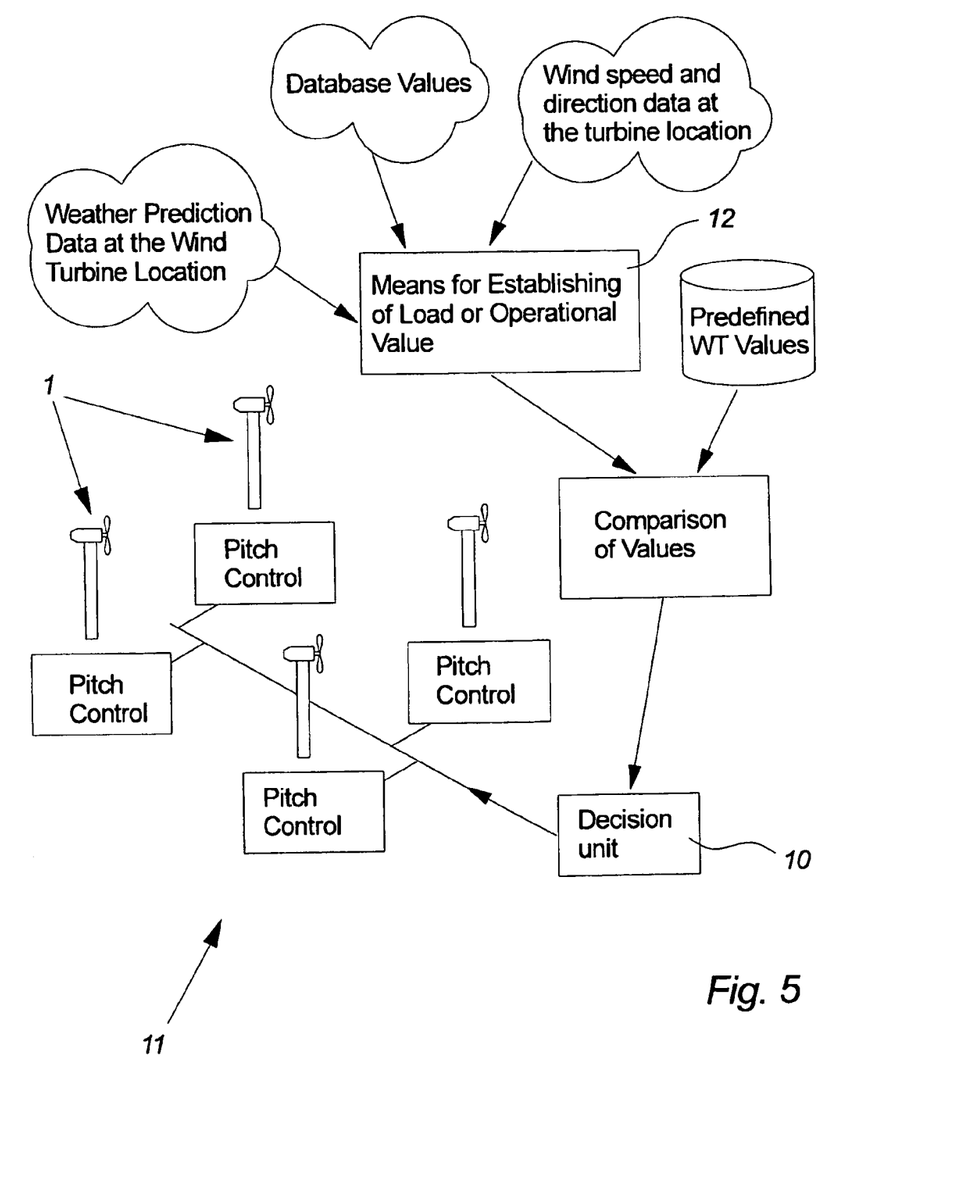
FIG. 5 illustrates a plurality of adjacent wind turbines controlled by a method according to a preferred embodiment of the invention.

FIG. 5 illustrates a further embodiment of the invention wherein the method explained in connection with FIG. 2 is used to control a plurality of adjacent wind turbines 1 e.g. in a wind park 11.

A wind park usually occupies an area of size without or with only a few examples of significant metrological differences over time and the wind turbines may thus also be controlled by one and the same method.

The figure also illustrates the different values which may be used in establishing the EPG values such as the measured wind speed or direction. The values may also—partly or fully—be based on metrological prediction data for the wind turbine location e.g. predictions on the wind speed, direction, risk of strong gusts etc. for the nearest future such as the next day. Further, empirical values in a database may be used such as knowledge of the weather in different periods of the year at the wind turbine location.

Figures 6A, 6B, 6C, 6D:
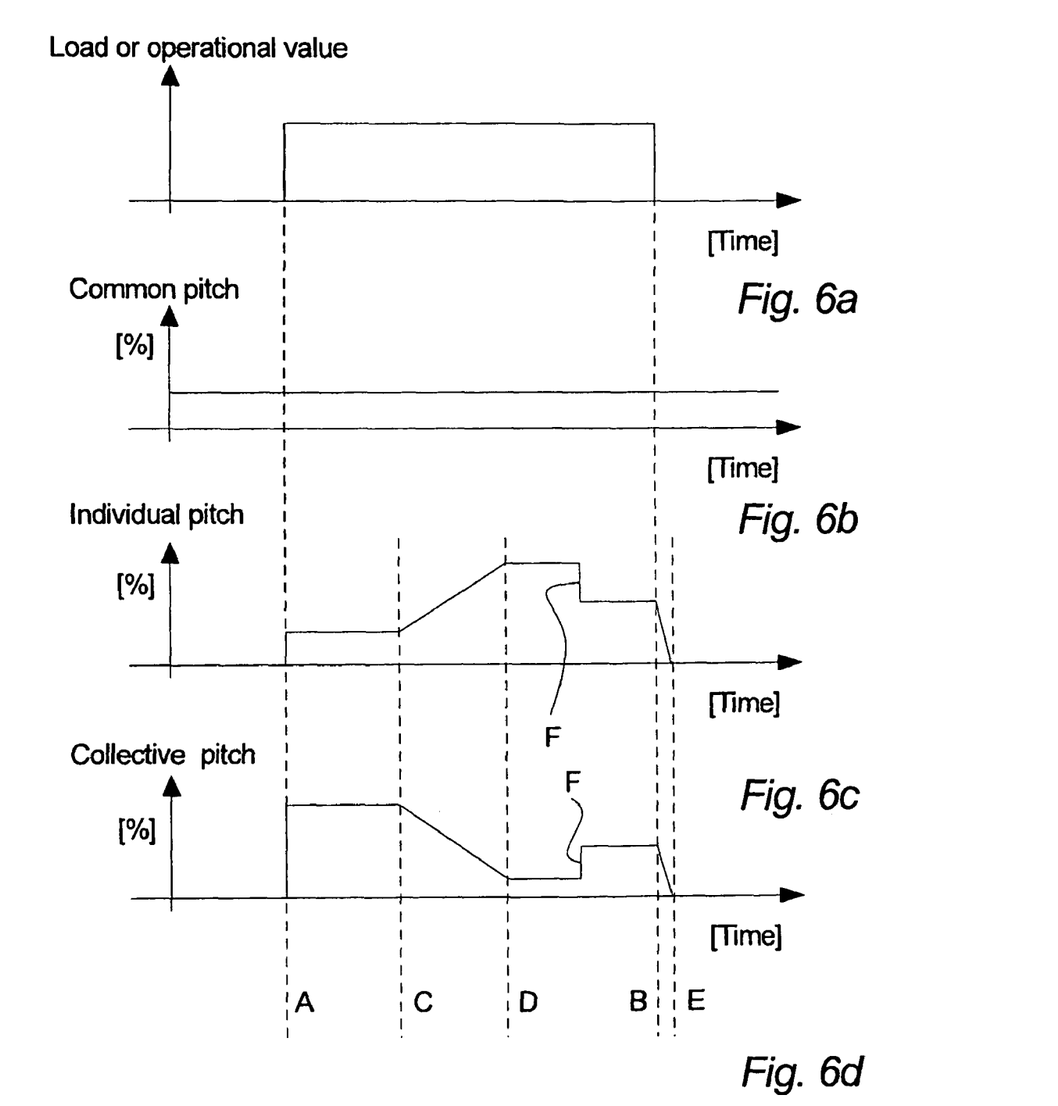
FIG. 6a-d illustrates an example of weighting of control strategies.

FIG. 6a-d shows an embodiment of the invention where the control of at least one adjustment mechanism of a wind turbine may comprise one or more states where weighting between one or more collective blade pitch control strategy and/or individual blade pitch control strategy is adjusted. It I of cause understood that the weighting may also comprise adjusting the weighting of common pitch control strategies, yaw control strategies and/or the like. When certain load values, operational values or other values, as explained above, obtains a specific value, is in a predefined interval or the like, occur at the time A (FIG. 6a), the control goes from only common control strategy (FIG. 6b) to also comprising collective blade pitch control strategy and even individual blade pitch control strategy (FIGS. 6c and 6d). As shown in FIG. 6c and FIG. 6d, the weighting between individual blade pitch control strategy, collective blade pitch control strategy and common control strategy in the time interval from A to B may be adjusted to obtain an advantageous pitching of the rotor blades, and/or yaw of the nacelle.

Further, as shown in FIG. 6c and FIG. 6d, the adjustment of the weighting between individual control strategy and collective control strategy may be performed instantly F, which may be advantageous in relation to changing the weighting between control strategies quickly.

Likewise the weighting between the combination of control strategies may comprise a transitional part, shown in FIG. 6c and FIG. 6d by the intervals from C to D and from B to E, performed with a gradual adjustment of weighting of the chosen control strategies. This may give the advantage of avoiding sudden changes in the load/stress on the wind turbine components when adjusting the weighting of the chosen control strategies.

In an embodiment of the invention which is not shown in any figures, the collective blade pitch control strategy and/or individual blade pitch control strategy may under certain circumstances be chosen and applied alone to control the adjustment mechanism(s) without the use of common pitching.

The method has mainly been explained in relation to a rotor blade pitch mechanism of a wind turbine but it should be emphasized that the method may also be used with the yaw mechanism of a wind turbine.

The invention described has been exemplified above with reference to specific examples of environmental and power generation values such as the wind speed. However, it should be understood that the invention is not limited to the particular examples but may be designed and altered in a multitude of varieties within the scope of the invention as specified in the claims e.g. with other or further values indicating the load on the wind turbines such as harmonic values in the generated power.

REFERENCE LIST

In the drawings the following reference numbers refer to:
1. Wind turbine
2. Wind turbine tower
3. Wind turbine nacelle
4. Wind turbine hub
5. Wind turbine blade
6. Wind turbine rotor with at least one blade
7. Blade pitch mechanism
8. Wind turbine foundation
9. Wind turbine yaw mechanism
10. Decision unit
11. Wind park comprising at least two wind turbines
12. Means for establishing at least one load or operational value

The invention claimed is:

1. A method for controlling at least one adjustment mechanism of a wind turbine, said method comprising the steps of:
establishing at least one load or operational value of the wind turbine,
choosing at least two control strategies from a set of different control strategies based on the established at least one load or operational value, and
applying the chosen control strategies at different times responsive to changes in the load or operational value to control said at least one adjustment mechanism.

2. The method according to claim 1, where the adjustment mechanism is a blade pitch mechanism.

3. The method according to claim 1, where said set of control strategies at least involve a common blade pitch control strategy.

4. The method according to claim 1, where said set of control strategies includes a common blade pitch control strategy, and at least one of a collective blade pitch control strategy, an individual blade pitch control strategy or a yaw control strategy.

5. The method according to claim 1, where said method involves adjusting a weighting between said chosen control strategies responsive to the changes in the load or operational value.

6. The method according to claim 1, where said load or operational value is based on measurements, calculations or estimates of one or more parameters, including at least one of wind speed, wind shear, wind direction, wind turbulence, temperature, yaw error, power generation, rotor rpm, blade loads, stresses, moments, and fatigue limits.

7. The method according to claim 1, where said load or operational value includes a hysteresis band with an upper threshold and a lower threshold, and wherein applying the control strategies to control said at least one adjustment mechanism is based at least in part on whether the load or operational value is within the hysteresis band.

8. The method according to claim 1, where a plurality of adjacent wind turbines is controlled independently or together by the same control strategy or strategies.

9. A wind turbine comprising:
a wind turbine rotor comprising at least one blade,
said wind turbine further comprising at least one adjustment mechanism and a controller adapted for controlling said adjustment mechanism according to a control strategy
an instrument for establishing at least one load or operational value of the wind turbine, and
a decision unit adapted for choosing at least one control strategy among a set of different control strategies in dependence of said at least one load or operational value,
wherein said controller is configured to apply the at least one control strategy at different times responsive to a change in the at least one load or operational value to control said adjustment mechanism.

10. The wind turbine according to claim 9, wherein said adjustment mechanism is a blade pitch mechanism.

11. The wind turbine according to claim 9, wherein said wind turbine is a variable speed wind turbine with at least one utility grid connected power converter.

12. The wind turbine according to claim 9, wherein said controller is adapted to adjust a weighting between said chosen of control strategies responsive to the change in the at least one load or operational value.

13. A wind park comprising at least two wind turbines according to claim 9.

14. The wind park according to claim 13, wherein said at least two wind turbines are controlled independently or together by the same control strategy or strategies.

* * * * *